United States Patent [19]

Huang et al.

[11] Patent Number: 4,861,745
[45] Date of Patent: Aug. 29, 1989

[54] HIGH TEMPERATURE SHIFT CATALYST AND PROCESS FOR ITS MANUFACTURE

[75] Inventors: Dinah C. Huang, Prospect, Ky.; Jeffrey L. Braden, New Albany, Ind.

[73] Assignee: United Catalyst Inc., Louisville, Ky.

[21] Appl. No.: 227,650

[22] Filed: Aug. 3, 1988

[51] Int. Cl.$^4$ .................. B01J 23/72; B01J 23/86; B01J 21/04
[52] U.S. Cl. .................. 502/314; 502/316; 423/656
[58] Field of Search ............ 502/314, 316; 423/656

[56] References Cited

U.S. PATENT DOCUMENTS

| | | | |
|---|---|---|---|
| 2,968,636 | 1/1961 | Sciallano et al. | 502/316 |
| 3,711,426 | 1/1973 | Jorgensen | 502/316 X |
| 4,305,846 | 12/1981 | Jennings | 502/316 |

Primary Examiner—W. J. Shine
Attorney, Agent, or Firm—Herbert P. Price

[57] ABSTRACT

An improved catalyst for the high temperature shift reaction especially suited for low steam to gas ratio applications is made by dipping an iron oxide-chromium oxide catalyst in an aqueous copper salt solution, drying the catalyst and calcining it.

13 Claims, No Drawings

HIGH TEMPERATURE SHIFT CATALYST AND PROCESS FOR ITS MANUFACTURE

BACKGROUND OF INVENTION

The field of art to which this invention pertains is catalysts for the high temperature shift reaction.

Hydrogen production from carbon monoxide and steam has for decades been one of the most important processes of the chemical industry. This reaction $$CO + H_2O \rightleftharpoons H_2 + CO_2$$

is commonly known as the water gas shift reaction which term was derived from 19th centruy generation of water gas which was manufactured by passing steam over hot coal to produce a mixture of carbon monoxide and hydrogen. The conversion of carbon monoxide by this reaction is favored by lower temperatures and the reaction is slightly exothermic.

While lower temperturees favor more complete carbon monoxide conversion, higher temperatures allow recovery of the heat of reaction at a sufficient temperature level to generate high pressure steam. For maximum efficiency and economy of operation, many plants contain a high temperature shift reaction unit for bulk carbon monoxide conversion and heat recovery, and a low temperature shift reaction unit for final carbon monoxide conversion.

The high temperature shift reaction is generally conducted at a temperature range of about 600°–950° F. using iron-chrome catalysts. The low temperature shift reaction is generally conducted at a temperature range of about 350°–550° F. using copper-zinc catalysts.

U.S. Pat. No. 4,540,563 describes shift reaction catalysts made of iron oxide and at least one other metal oxide which is difficult to reduce to metal.

High temperature shift reaction catalysts made of iron oxide and chromium oxide modified with magnesium oxide are disclosed in U.S. Pat. No. 4,598,062.

In U.S. Pat. No. 4,503,162, shift reaction catalysts made by coprecipitating iron, aluminum and copper salts followed by drying and calcining are described.

According to French Pat. No. 2,554,433, shift reaction catalysts are made by grinding together lithium carbonate, copper oxide, iron oxide and iron nitrate, drying the powder and calcining it. In French Pat. No. 2,553,399, catalysts are made by a similar procedure form manganese carbonate, copper nitrate, ferric oxide and chromic nitrate.

Prasad and Sarma, *Fertilizer Technology*, Vol. 17, (1 and 2), 62–65 (1980) describe the effect of copper and potassium on the activity of iron-oxcide-chrome oxide shift reaction catalysts. These catalysts, which contain ferric oxide in admixture with chromic oxide in the amount of 7–8% and copper oxide in the amount of 0.5–2%, were made from ferric oxide kneaded with chromic acid and copper acetate, followed by drying and sintering. The copper containing catalysts were not as active in the high temperature shift reaction at a steam to gas ratio of 3:1 as catalysts which contained no copper.

In an effort to save energy in the production of hydrogen and ammonia, plants sometimes attempt to operate with lower amounts of steam added to the steam hydrocarbon reforming unit. The consequence of this low steam/carbon ratio (S/C) is that the high temperature shift unit will be forced to operate at lower steam to gas ratios (S/G) and higher carbon monoxide/carbon dioxide ratios. The combination of these factors in the high temperature shift reaction using iron-chromium catalysts can lead to hydrocarbon by-product formation via the Fischer-Tropsch reaction.

SUMMARY OF INVENTION

This invention is directed to the high temperature shift reaction. In one aspect, this invention relates to an improved catalyst for the high temperature shift reaction. In another aspect, this invention pertains to a process for making an improved catalyst. In yet another aspect, this invention relates to a high temperature shift reaction having reduced by-product formation particularly when the high temperature shift unit is operated at lower S/C and higher CO/CO$_2$ ratios.

The high temperature shift catalyst of this invention is comprised of a major amount of iron oxide and a minor amount of chromium oxide and containing on the surface thereof a minor amount of copper oxide. The catalyst is made by dipping an iron oxide-chromium oxide catalyst in an aqueous copper salt solution, the concentration of the solution being sufficient to obtain about 0.2 to about 10 weight percent copper oxide on the finished catalyst, after drying and calcining.

DESCRIPTION OF INVENTION

The high temperature shift catalyst of this invention is basically an iron oxide-chromium oxide catalyst modified with copper oxide. The catalyst contains about 85 to about 95 weight percent iron oxides and about 5 to about 15 weight percent chromium oxide, modified with about 0.2 to about 10 weight percent copper oxide. Preferably, the copper oxide content is about 0.5 to about 2.5 weight percent, most preferably about 1.2 to about 1.8 weight percent. The iron is preferalby ferric, the chromium is preferably chromic, and the copper is preferably cupric. The catalyst can also contain minor amounts of other components, such as up to about 3.5 weight percent alumina, and up to about 3 weight percent carbon in the form of graphite. The above weight percentages are based on the total weight of the catalyst.

The iron oxide-chromium oxide catalyst, prior to modification with copper oxide, is made by a conventional process which involves forming an aqueous solution of ferrous sulfate and sodium bichromate, precipitating the salts with sodium hydroxide, followed by filtering, washing, calcining, and tableting. This procedure is described in detail in U.S. Pat. No. 4,598,062 which is hereby incorporated by reference.

The catalyst of the invention is made by dipping the formed iron-chromium catalyst in an aqueous solution of a copper salt, the concentration of which is sufficient to obtain sufficient copper on the catalyst so thaat, after calcining, the catalyst will contain about 0.2 to about 10 weight percent copper oxide. Water soluble copper salts that can be used in this process are copper nitrate and the copper-amine salts. The preferred salt is copper amine carbonate [Cu(NH$_3$)$_4$CO$_3$].

The aqueous copper oslutions in which the iron-chromium catalysts are dipped contain about 0.4 to about 25 weight percent of copper and preferably about 1 to about 6 weight percent. The catalysts are dipped in the copper solution for a time sufficient for the solution to thoroughly wet the surface of the catalyst, such time being about 15 minutes to about 1 hour. After removal from the copper solution, the catalyst is dried at about 300° to about 500° F. for about 1 to about 4 hours and is then calcined at 700°–1000° F. for about 30 minutes to about 3 hours.

Alternatively, the copper containing catalyst can be prepared by first dipping the iron-chromium catalyst in an alcohol aluminum alkoxide solution, preferably aluminum isopropoxide, drying the catalyst at a temperature sufficient to remove the alcohol, i.e., about 125° to about 200° F., followed by dipping the catalyst in an aqueous solution of copper nitrate and aluminum nitrate or copper amine carbonate, and drying and calcining as stated hereinabove.

As stated hereinbefore, in an effort to save energy in the production of hydrogen and ammonia from hydrocarbons and water, plants attempt to operate with lower amounts of steam added to the front end hydrocarbon reforming unit. This results in low steam to gas ratios and higher carbon monoxide to carbon dioxide ratios in the high temperature shift unit. Fischer-Tropsch reactions can occur under such conditions which lead to hydrocarbon by-product formation. This in turn leads to less hydrogen produced and lower ammonia production. It has been found that the use of the catalyst of this invention in the high temperature shift reaction following a hydrocarbon reforming reaction wherein the steam to carbon ratio (S/C) is less than 3 results in less by-product formation than when the high temperature shift process is conducted with iron-chromium catalyst that contains no copper.

The high temperature shift catalysts of this invention, which contain copper on the surfaces, produce much lower levels of hydrocarbon by-products than iron-chromium catalysts which contain copper in the bulk of the catalyst, e.g., catalysts which are formed by adding the copper salt to the iron-chromium filter cake during the spray drying of the cake.

The following examples describe the invention in more detail. Percentages are weight percents unless otherwise designated.

EXAMPLE 1

Iron-chromium catalysts were prepared by the conventional process of coprecipitation of iron sulfate and sodium bichromate with caustic followed by filtration, spray drying, calcining, and tableting. This finished iron-chromium catalyst contained 8.0% chromium oxide, 1.5% carbon, trace amounts of chlorine and sulfur with the remainder being ferric oxide. This catalyst, the control, is referred to as Catalyst I.

Catalyst I was dipped in an aqueous solution of copper amine carbonate containing 2.7% copper for 30 minutes, followed by drying at 350° F. for 2 hours and calcining at 800° F. for 2 hours. This catalyst, referred to as Catalyst II had a CuO content of 1.5%.

Another catalyst was prepared using the same procedure as described in the preceding paragraph. This catalyst, Catalyst III, had a CuO content of 0.95%.

Catalyst IV was prepared by adding copper nitrate and aluminum nitrate to the bulk of the catalyst during the spray-drying step. The catalyst contained 0.95% CuO and 2.5% aluminum oxide.

The catalysts were evaluated in a Dowtherm dual tube reactor unit providing an identical S/G and feedgas to both tubes. Both reactor tubes were fed from a common feedgas source by splitting the stream after gas and steam mixing. The flow of steam-gas mix through each tube of the reactor was governed by separate exit-gas control valves.

Before testing, the catalysts were desulfurized and activated using procedures well known to those skilled in the art.

The catalysts were evaluated for high temperature shift activity and by-product hydrocarbon formation under the following conditions:

| | |
|---|---|
| Pressure | 440 psig |
| Temperature | 700° F. (isothermal) |
| Feed Gas | 14.49% CO |
| | 6.43% $CO_2$ |
| | 23.39% $N_2$ |
| | 55.69% $H_2$ |
| S/G (Inlet) | 0.45 (Reformer S/C = 2.75) |
| Catalyst Volume | 25 cc whole particles diluted with packing |
| DGSV (inlet) | 2320 L/L/hr |

The CO conversion and hydrocarbon by-product formation for each catalyst used in the process are shown in the table.

| Catalyst | I | | II | | III | IV |
|---|---|---|---|---|---|---|
| Days on stream | 14.6 | 22.4 | 14.6 | 22.4 | 13.0 | 13.0 |
| % CO conversion | 77.20 | 76.57 | 77.22 | 75.29 | 77.0 | 77.82 |
| BY-PRODUCT (ppmv of inlet) | | | | | | |
| $CH_4$ | 277 | 335 | 29 | 38 | 23 | 95 |
| $C_2H_6$ | 16 | 18 | — | — | — | 5 |
| $C_2H_4$ | 21 | 26 | — | — | — | 6 |

As can be seen from the data listed in the table, hydrocarbon by-product formation is reduced considerably when catalysts containing copper on the surface are used.

EXAMPLE 2

Using the same procedure described in Example 1, Catalyst I, a conventional iron-chromium high temperature shift catalyst was prepared by the coprecipitation of iron sulfate and sodium bichromate with caustic followed by filtration, spray drying, calcining and tableting. This catalyst is referred to as Catalyst 2A.

A portion of the filter cake from above was spray dried with the addition of an aqueous solution of copper amine carbonate in an amount sufficient to have 2.5% CuO in the finished catalyst. After spray drying, the catalyst was calcined and tableted. This catalyst is referred to as Catalyst 2B.

Another portion of the filter cake was spray dried with the addition of an aqueous solution of copper nitrate and aluminum nitrate, and was finished as described above. This catalyst, Catalyst 2C, contained 1% copper oxide and 2.1% aluminum oxide.

Catalyst 2D was prepared by dipping Catalyst 2A in an aqueous solution of copper nitrate and aluminum nitrate. After drying at 350° F. for 2 hours and calcining at 800° F. for 2 hours, the catalyst contained 1.14% copper oxide and 2.06% aluminum oxide.

Catalyst 2E was prepared by dipping Catalyst 2A in an alcohol solution of aluminum isopropoxide, drying at 150° F. for 30 minutes, then dipping the catalyst in an aqueous solution of copper nitrate and aluminum nitrate, followed by drying and calcining. The catalyst contained 0.99% copper oxide and 1.81% aluminum oxide.

Catalyst 2F was prepared by dipping Catalyst 2A in an alcohol solution of aluminum isopropoxide, drying, and then dipping it in an aqueous solution of copper amine carbonate. After drying and calcining, the catalyst contained 1.68% copper oxide.

After being desulfurized and activated, the catalysts were evaluated for high temperature shift activity and by-product hydrocarbon formation at the following conditions which correspond to reformer S/C of 2.5.

| Pressure | 440 psig |
|---|---|
| Temperature | 700° F. (isothermal) |
| Feed Gas | 14.49% CO |
| | 6.43% $CO_2$ |
| | 23.39% $N_2$ |
| | 55.69% $H_2$ |
| S/G (inlet) | 0.411 |
| Catalyst Volume | 25 cc whole particles diluted with 25 cc packing |
| DGSV (inlet) | 2565 L/L/Hr. |

The CO conversion and hydrocarbon by-product formation for each catalyst is shown in the table.

| Catalyst | 2A | 2B | 2C | 2D | 2E | 2F |
|---|---|---|---|---|---|---|
| Days | 12 | 13 | 13 | 12 | 13 | 13 |
| % CO conversion | 75.04 | 75.93 | 75.47 | 78.88 | 74.28 | 77.62 |
| BY-PRODUCT (ppmv of inlet) | | | | | | |
| $CH_4$ | 251 | 171 | 213 | 43 | 57 | 51 |
| $C_2H_6$ | 11 | 11 | 14 | 1 | 1 | 1 |
| $C_2H_4$ | 6 | 2 | 3 | | 1 | |

Catalysts 2D, 2E and 2F, which contain copper oxide on the surface, have superior activity and reduced by-product formation to catalysts which contained no copper or wherein the copper was added in the bulk.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed:

1. A high temperature water-gas shift reaction catalyst which comprises:
   (a) a major portion of iron oxide, and
   (b) a minor portion of chromium oxide modified with
   (c) a minor portion of copper oxide wherein the copper oxide is substantially on the surface of the catalyst.

2. The catalyst of claim 1 wherein the iron oxide is present in the amount of about 85 to about 95 weight percent, and the chromium oxide is present in the amount of about 5 to about 15 weight percent, wherein the copper oxide is present in the amount of about 0.2 to about 10 weight percent, said weight percents being based on the total weight of the catalyst.

3. The catalyst of claim 2 wherein the copper oxide is present in the amount of about 0.5 to about 2.5 weight percent.

4. The catalyst of claim 2 wherein the copper oxide is present in the amount of about 1.2 to about 1.8 weight percent.

5. The catalyst of claim 1 wherein the copper oxide is obtained on the surface of the catalyst by dipping a preformed iron oxide-chromium oxide catalyst in an aqueous solution of a copper salt, drying the catalyst and calcining it.

6. A process for the manufacture of a high temperature water-gas shift catalyst which comprises:
   (a) dipping a tasbleted iron oxide-chromium oxide catalyst in an aqueous solution of a copper salt;
   (b) removing the catalyst from the solution;
   (c) drying the catalyst at a temperature of about 300° to about 500° F.; and
   (d) calcining the catalyst at a temperature of about 700° to about 1000° F.;
   wherein step (a) is conducted using an aqueous copper salt solution so as to obtain about 0.2 to about 10 weight percent copper oxide on the catalyst obtained after step (d).

7. The process of claim 6 wherein step (a) is conducted so as to obtain about 0.5 to about 2.5 weight percent copper oxide on the catalyst.

8. The process of claim 6 wherein step (a) is conducted so as to obtain about 1.2 to about 1.8 weight percent copper oxide on the catalyst.

9. The process of claim 6 wherein the copper salt is copper nitrate or a copper amine salt.

10. The process of claim 9 wherein the copper salt is $Cu(NH_3)_4CO_3$.

11. The process of claim 6 wherein the concentration of the aqueous salt solution is about 0.4 to about 25 weight percent copper based on the total weight of the solution.

12. The process of claim 11 wherein the concentration of the copper salt solution is bout 1 to about 6 weight percent copper.

13. The process of claim 6 wherein the tableted iron oxide-chromium oxide catalyst is treated with an alcoholic solution of aluminum alkoxide and dried prior to dipping in the aqueous copper salt solution.

* * * * *